United States Patent [19]

Krawiec et al.

[11] Patent Number: 4,543,373
[45] Date of Patent: Sep. 24, 1985

[54] FAST CURING FURAN FOUNDRY BINDER SYSTEM CONTAINING A METAL SALT ACCELERATOR

[75] Inventors: Robert Krawiec, Des Plaines; James E. Menting, Algonquin, both of Ill.

[73] Assignee: QO Chemicals, Inc., Chicago, Ill.

[21] Appl. No.: 669,647

[22] Filed: Nov. 8, 1984

[51] Int. Cl.$^4$ .............................................. C08K 3/36
[52] U.S. Cl. ................................. 523/144; 524/549; 264/219
[58] Field of Search ..................... 523/144; 264/219

[56] References Cited

U.S. PATENT DOCUMENTS

| 3,184,814 | 5/1965 | Brown | 523/144 |
| 3,709,849 | 1/1973 | Lemon et al. | 523/144 |
| 3,725,333 | 4/1973 | Adkins et al. | 523/144 |
| 4,119,606 | 10/1978 | Teplyakov et al. | 523/144 |
| 4,220,578 | 9/1980 | Kho et al. | 523/144 |
| 4,371,648 | 2/1983 | Gardikes et al. | 523/144 |
| 4,373,058 | 2/1983 | Horton | 524/789 |

Primary Examiner—Lewis T. Jacobs
Attorney, Agent, or Firm—Neuman, Williams, Anderson & Olson

[57] ABSTRACT

Quick curing "no bake" foundry core and mold compositions containing metal salt accelerators to provide shaped sand shapes which can be removed from a mold in a period of not more than about 40 seconds.

13 Claims, No Drawings

FAST CURING FURAN FOUNDRY BINDER SYSTEM CONTAINING A METAL SALT ACCELERATOR

This invention relates to the metal foundry art and more particularly to novel compositions and methods for producing foundry molds and cores.

A number of methods are employed in modern foundries in the production of cured foundry molds and cores. Each of these methods addresses, to some extent, the needs for high productivity, environmental safety, reduction of breakage and loss, short operational downtime, low equipment cost and lowered energy costs. The three most commonly practiced foundry methods are the (1) "hot box", (2) "gassing" and (3) "no-bake" methods. In the "no-bake" methods, the foundry sand composition cures at room temperature. The "no-bake" compositions usually contain an active catalyst which slowly catalyzes the binder to cure over time. Thus, the foundry shape formed from a "no-bake" binder-sand composition must be allowed to stand until a cure is achieved and the shape is sufficiently hardened to be usable as a mold or core for molten metal pours. The "no-bake" methods can employ relatively inexpensive molds but these methods are frequently time consuming because of the slow cure of the system. Until the binder in the foundry composition partially cures and hardens sufficiently to stand free of the mold and/or be handled without breaking or distorting the mold cannot be removed. Thus, numerous molds are required to keep the production up. Once the shape has achieved adequate strength to be free-standing without the support of a mold, the mold may be carefully removed and the shape carefully placed in a protected area where the binder may continue to harden until the sand shape is thoroughly cured. Handling the freshly stripped sand shape requires care to avoid breakage. Thus, the convenience of a slow curing system must be balanced against the efficiencies of rapid cure for high speed production operations.

Research and development in the foundry industry have been directed toward methods and compositions which will increase the productivity of the foundry, with particular efforts directed toward methods for high speed mechanization of typically manual operations, such as mixing and ramming of sand-binder foundry compositions. Typical of such mechanization are the core-blowing apparatuses in which a first mixture of sand-binder is provided in one storage hopper of the apparatus and a second mixture comprising sand-catalyst is provided in a second storage hopper. When the hoppers are opened, the apparatus delivers a quantity of each of the two respective mixtures into a common mixing chamber and thereafter blows the mix into a core or mold box to form the foundry sand shape. While such apparatuses reduce production time required as compared to manual mixing and ramming operations, when no-bake binders are employed with such apparatuses they are limited as to truly high speed production by the length of time necessary for curing to harden the shape to "green strength", prior to removal from the mold cavity. Such "green strength" sand shapes must then be carefully removed from the mold and placed in a protected area to reduce breakage prior to curing.

A core-blowing apparatus which has recently become available from the Beardsley & Piper Company mixes and blows a foundry composition into the mold cavity in an extremely short period of time; e.g. less than eight seconds. Such a shortened mix and blow time effectively shortens production time. The operating efficiency would be even more enhanced if the strip time from the mold is shortened yielding a sand shape which is cured to sufficient hardness to allow stripping from the cavity in significantly shorter times than binder catalyst systems heretofore known. While shortened strip-times are advantageous, the cure should not result in "overcure" or "burn-out" which lead to friable cores and molds and result in product loss. Immediate cure prior to strip would eliminate many of the handling difficulties associated with the stripping of a green strength sand shape from a mold cavity.

The use of metal salt catalysts, in particular, zinc chloride catalysts, in compositions which are employed in heat curing/setting methods is known. For instance, U.S. Pat. No. 2,909,450 discloses a heat-curable impregnator for porous and fibrous materials containing furfuryl alcohol and a zinc chloride catalyst in the form of a storage-stable aqueous solution at room temperature. Also, U.S. Pat. No. 3,725,333 discloses a foundry molding composition containing phenol-formaldehyde resin modified with furfural or furfuryl alcohol and employing zinc chloride as a curing agent for use in hot-box methods wherein the pattern is heated to a temperature of 350°–600° F. U.S. Pat. No. 3,360,492 discusses a number of patents disclosing molding compositions containing furfuryl alcohol binders which employ as an acid polymerization catalyst zinc chloride. That patent discusses the fact that acidic polymerization catalysts result in rapid cure " . . . upon application of heat." Thus, it is clear that the foundry art has found use for zinc chloride as a catalyst in applications in which heat is employed to activate the cure of the binder. Zinc chloride has also been found to be effective as a catalyst in certain specific cold curing formulations. A recently issued U.S. Pat. No. 4,361,670, discloses the use of zinc chloride promoter for use in polymer concrete in conjunction with a furfuryl alcohol monomer. The patent discloses the use of 20–80% by weight (based on the weight of the furfuryl alcohol monomer) of the zinc chloride salt and indicates that when trichlorotoluene is employed as the catalyst, a cure results in 30–60 minutes.

U.S. Pat. No. 3,709,849 describes a two-part foundry binder system employed in a cold set process in which a first aliquot of sand is coated with a methylated product and a second aliquot of sand is coated with an acidic material in a suspension of phenolic novolak resin. These two sand aliquots are then admixed to result in a cure. The patent teaches that zinc chloride can be employed as one of the acidic materials. The acidic material and the novolak resin are coated on the same sand batch, which indicates that the zinc chloride does not result in an active cure of the binder.

It is an object of this invention to provide quickcuring compositions useful in foundries to form molds and cores.

It is a further object of this invention to provide a foundry mold or core composition which can be quickly formed by blowing components thereof into a mold cavity without set-up prior to blowing.

It is a further object of this invention to provide a foundry core or mold composition which cures in less than about 40 seconds but which has a working bench life of more than 8 seconds.

The present invention achieves the above and other objects by forming sand molds or cores using a furan-based binder, an aromatic sulfonic acid catalyst, and a metal salt accelerator selected from the group consisting of zinc chloride and copper chloride. Thus, the present invention provides compositions for forming foundry sand cores or sand molds which at ambient temperatures and without heating can be stripped from a mold cavity within a period of not more than about 40 seconds after placing the composition in said mold cavity. The composition comprises sand, an aromatic sulfonic acid catalyst, a furan-based binder and an accelerator selected from the group of zinc chloride and copper chloride. Also, the invention provides a process for forming a foundry sand core or sand mold using two sand mixes which are mixed immediately prior to being blown into a core box or mold. The first admixture comprises sand and an aromatic sulfonic acid catalyst and a second admixture comprises sand, a furan-based binder and an accelerator selected from zinc chloride and copper chloride. A shaped sand mass is removed from the mold cavity within a period of not more than about 40 seconds from the time the sand/binder/catalyst/accelerator compositions are placed in said mold cavity.

In accordance with one preferred embodiment of the present invention, two respective discrete sand mixes are used to form a core or mold. One of the sand mixes contains an acid catalyst with sand, and the second contains a binder for the sand and the zinc chloride or copper chloride salt accelerator mixed on sand. The two sand mixes are rapidly mixed together just prior to being blown into a mold cavity to produce a cured foundry sand shape in less than about 40 seconds with the working life available (e.g. the time from the initial mixing of the two sand mixes to the initiation of cure) being greater than about 8 seconds. Thus, according to this preferred embodiment, there is provided a foundry composition for forming sand cores or sand molds which at ambient temperature can be stripped from a mold cavity in less than about 40 seconds.

Referring now to the binder material suitable for use in a foundry mix according to the present invention, a furan-based resin is most advantageously used. By "furan-based" as used herein is meant those binders which contain derivatives of furan, particularly including furfuryl alcohol polymers, whether used alone or used with other resins such as phenolic resins, urea formaldehyde resins or mixtures thereof. The furfuryl alcohol polymers include those polymers prepared by reacting furfuryl alcohol with itself, with formaldehyde or with urea. These resins are commercially available and include resins identified as "QUA-CORR®1001" resin, or FaRez® B-270 furan-based resin supplied by QO Chemicals, Inc. of Chicago, Ill.

The foundry binder compositions of the present invention can be employed in any method in which rapid mixing and packing of a mold cavity is accomplished. It is preferred, therefore, to employ high speed mixing and blowing machines for filling a mold cavity. One such suitable machine is produced commercially by Beardsley & Piper Company and is called an "ABC" core making apparatus. This machine has a dual hopper for the storage of the respective sand mixes, a mixing unit for mixing upon discharge from the hopper and a blowing system for packing the sand into the mold cavity. Other high speed mixing and blowing machines can also be used.

The acid catalysts suitable for use in accordance with the present invention are sulfonic acid catalysts, and more preferably aromatic sulfonic acids such as, for example, benzene sulfonic acid, xylene sulfonic acid, toluene sulfonic acid, phenol sulfonic acid and the like and combinations thereof. Benzene sulfonic acid is preferred, either alone or in combination with xylene sulfonic acid.

Metal salt accererators suitable for use in accordance with the present invention are those metal salts which provide a sufficient increase in the rate of cure, without decreasing the tensile strength due to overcure, of foundry compositions containing an aromatic sulfonic acid and furan-based resins to yield a foundry sand shape capable of being structurally sound enough to be stripped from the mold in a time period of less than about 40 seconds from the start of the mixing period. Additionally, the accelerator must provide a mix having a working life greater than about 8 seconds. Generally, the accelerator is employed in amounts ranging from 5 to 20% by weight of binder. The most preferred metal salts for use in accordance with the present invention are zinc chloride and copper chloride, with the optimum salt being zinc chloride. The sands which are employed can be of various types conventionally used in making foundry articles, with neutral or acidic sands generally being preferred, although basic sands can be utilized. Thus, for example, the core or mold sand can be pure quartz sand (99% silica), lake sand (95% silica), chromite sand, zircon sand, sea sand and so forth.

We have found that admixture of the furan binder with sand prior to admixture of zinc chloride or copper chloride therewith results in a faster cure and strip time from the mold cavity, with no loss in tensile strength. Thus, in most preferred embodiments the method of the present invention includes the addition of a furan binder onto a sand, followed by admixture of the metal salt accelerator therein.

The aromatic sulfonic acid catalysts for use in accordance with the present invention are used in amounts ranging from 25 to 75 percent by weight of the furan binder material depending on the type of sulfonic acid catalyst employed. The amount of furan binder which is used in the foundry composition is determined by the amount of surface area on the sand to be used and, for example, sand mixes which have incorporated therein a furan-based binder in an amount from 0.8 to 2 percent by weight of the sand are, generally speaking, satisfactory in accordance with the present invention.

When employing the foundry binder composition of this invention to produce a cured sand shape, it is preferred to employ a silane adhesion promoter in an amount ranging from 0.1 percent to 3 percent based on the weight of the binder in such composition. The silane is preferably admixed into the binder composition prior to its admixture onto the sand. Such silane adhesion promoters are well known in the art and include, for example, gamma-mercaptopropyltrimethoxysilane, N-beta(aminoethyl)-gamma-aminopropyltrimethoxysilane, beta-(3,4-epoxycyclohexyl)ethyltrimethoxysilane, gamma-glycidoxypropyltrimethoxysilane, gamma-aminopropyltriphenoxysilane, gamma-aminopropyltribenzoyoxysilane, gamma-aminopropyltrifurfuroxysilane, gamma-aminopropyltri(o-chlorophenoxy)silane, gamma-aminopropyltri(tetrahydrofurfuroxy)silane, methyl[2-gamma-triethoxysilypropylamino)ethyl amino]3-propionate in methanol, modified aminoorganosilane, Ureido-silane, mercaptoethyltriethoxysilane, chloropropyltrimethoxysilane, vinyltrichlorosilane, vinyltriethoxysilane, vinyltrimethoxysilane, gamma-methacryloxypropyltrimethoxysilane, gamma-methacryloxypropyltri(2-methoxyethoxy)silane, gamma-glycidoxypropyltrimethoxysilane, vinyltriacetoxysilane, gamma-mercaptopropyltrimethoxysilane, gamma-aminopropyltriethoxysilane, N-beta(aminoethyl)-gamma-aminopropyltrimethoxysilane.

The expression "core sand" is sometimes used herein to include sand used in making shapes of all sorts for foundry purposes, including sand shapes which are to be used as mold cores, sand shapes useful in other casting processes, including sand shapes which are made in patterns and cured therein as well as free standing sand shapes which may be cured in conventional ovens or in microwave ovens for any desirable purpose in foundry work.

The following examples are provided for illustration only, and are not intended to be limiting with respect to the practice in accordance with the present invention.

In the following examples, all parts are expressed in parts by weight, all percents are expressed in percent by weight, all temperatures are expressed in degrees Fahrenheit, unless otherwise indicated.

The following examples provide the result of certain test methods which were used to predict the effectiveness and speed with which the foundry compositions of the present invention are prepared and cured. These tests indicate that the "tensile strengths" and uniformity of the final sand product and the "work time" within which the sand-binder-catalyst mix can be handled and shaped. In making the test set forth herein to determine the strength which the sand shape possesses, a so-called "tensile strength biscuit" having uniform cross section is prepared. This is a formation of sand shaped in a characteristic way (a "dog bone" shape) and bonded by the resin being tested. After the so-called biscuit is formed, it is placed in a machine adapted to determine what the tensile and ultimate yield strengths of the part thus formed are. The shape of a typical briquette or biscuit is well known to those skilled in the art and accordingly, the characteristics thereof are not discussed further herein; for example, however, reference is made to such typical biscuit in a book entitled *Steel Foundry Practice*, by J. H. Hall, (Penton Publishing Co., Cleveland, Ohio 1950) where such unit is shown and described on page 8. Although the shape is stripped from the mold within about 40 seconds or less, the shape is not yet fully cured at that time. Thus, tensile strengths are not determined until at least one hour after removal from the mold and more preferably after curing overnight. The "scratch hardness" tests indicate how hard the surface of the test specimen is. The "working time" or working life is the determination of the time from the initial admixing of the two sand mixes to the time in which acceptable foundry shapes can be made therefrom. The "strip time" is the period required to produce a core that is hardened by cure to resist distortion upon withdrawal from the core box.

EXAMPLE 1

This example provides a comparison of foundry sand compositions in accordance with the present invention which contain a zinc chloride metal salt accelerator with those in which no metal salt accelerator is employed.

In Tests A and B, which are not in accordance with the present invention because they contain no metal salt accelerator, the foundry compositions were prepared by admixing 1500 parts of Wedron silica sand with 37.5 parts of a furfuryl alcohol-formaldehyde resin binder. 1500 parts of sand was also admixed with 15 parts of a 75% aqueous solution of benzene sulfonic acid. The admixture of the binder/sand mix with the acid/sand mix was done in a commercial ABC mixer made by Beardsley & Piper which mixes and blows the foundry sand composition directly into a mold cavity in less than 8 seconds. In Test A, the mold was stripped in 30 seconds and the sand shape disintegrated upon removal from the molding cavity. In Test B, the composition was permitted to remain in the molding cavity for 90 seconds or until it had hardened sufficiently to retain its shape upon removal from the molding cavity.

Tests A and B can be compared to Test C which is in accordance with the present invention wherein a zinc chloride metal salt accelerator is employed and in which the sand shape is capable of being removed from the molding cavity in less than 40 seconds. In Test C, 1500 parts of Wedron silica sand was admixed with 5.6 parts of zinc chloride solution (70% in water). The sand/metal salt accelerator mixture was then admixed with 37.5 parts of furan formaldehyde binder. Another 1500 parts of sand was then mixed with 15 parts of a 75% aqueous solution of benzene sulfonic acid. Once again the two sand mixes were mixed in a Beardsley & Piper ABC core blowing apparatus and after mixing, the foundry composition was blown into the mold cavity in less than 8 seconds. In Test C the sand shape was sufficiently handleable to be stripped from the molding cavity in 30 seconds. For comparison purposes, the sand shape of Tests B and C were permitted to remain overnight at ambient conditions and were then tested for tensile strength (pounds per square inch). The tensile strengths are listed on the Table under the column ON-TENSILES (PSI). The ON-TENSILS listed is the 24 hour tensile strength in pounds per square inch.

TABLE 1

| Test | ZnCl$_2$ | Strip Time | ON-TENSILES |
|------|----------|-----------|-------------|
| A | 0 | 30 sec. | Fell Apart |
| B | 0 | 90 sec. | 325 |
| c | 5.6 | 30 sec. | 230 |

The metal salt accelerator permits the sand shape to be stripped from the mold cavity in an extremely short period of time, i.e. less than 40 seconds. While sand shapes can be prepared without the metal accelerator which do have acceptable tensile strengths, these sand shapes which do not contain the metal salt accelerator must be permitted to reside within the molding cavity for a longer period of time before stripping, or they will not be sufficiently handleable to retain their shape upon removal from the cavity.

EXAMPLE 2

This example provides a comparison of a foundry composition containing zinc chloride in accordance with the present invention with foundry compositions which contain other metal chloride salts. In each test listed on Table 2, a foundry composition was prepared in accordance with the method described for Test C in Example 1, except that the metal salt is the metal salt listed on the Table. The metal salts were employed in their most saturated solutions and the concentration of each salt at saturation is listed on Table 2.

TABLE 2

| Salt | Concentration | Strip Time | ON-TENSILE | Results When Stripped at 40 sec. |
|---|---|---|---|---|
| None | — | 90 sec. | 425 | Fell Apart |
| $ZnCl_2$ | 79% | 28 sec. | 250 | Good |
| $CuCl_2$ | 40% | 48 sec. | 200 | Good |
| $NaCl_2$ | 25% | 150 sec. | 285 | Fell Apart |
| $MgCl_2$ | 43% | 115 sec. | 350 | Fell Apart |
| $NiCl_2$ | 36% | 120 sec. | 370 | Fell Apart |
| $MnCl_2$ | 38% | 70 sec. | 355 | Fell Apart |
| $AlCl_3$ | 50% | 63 sec. | 355 | Fell Apart |
| $FeCl_3$* | 40% | 48 sec. | 325 | Good |

*Very short bench life. Also strong HCl odor.

As can be observed from Table 2, when the metal salts other than the metal salts in accordance with the present invention are employed and the shapes are stripped from the molding cavity after residing within the molding cavity for 40 seconds, the shapes fall apart and tensiles cannot be measured. However, when these shapes are permitted to reside within the molding cavity until they are sufficiently handleable to be stripped therefrom, the shapes will obtain a usable tensile strength when allowed to stand overnight.

EXAMPLE 3

This example provides a comparison of the aromatic sulfonic acid catalysts which are preferred for use in accordance with the present invention with other types of catalysts used in conjunction with zinc chloride accelerator. The general mixing procedure described in Example 1, Test C, was employed in each test listed on Table 3. However, the amounts and concentrations of the various components of the foundry composition are those amounts listed on Table 3.

TABLE 3

| Acid* | Conc. | $ZnCl_2$* | Strip Time | ON-TENSILES |
|---|---|---|---|---|
| 50% Benzene sulfonic | 75% | 0% | 51 sec. | 300 |
| 50% Benzene sulfonic | 75% | 15% | 18 sec. | 195 |
| 50% Toluene sulfonic | 65% | 0% | 205 sec. | 340 |
| 50% Toluene sulfonic | 65% | 15% | 63 sec. | 320 |
| 50% Toluene sulfonic | 65% | 25% | 37 sec. | 155 |
| 50% Xylene sulfonic | 80% | 0% | 78 sec. | 445 |
| 50% Xylene sulfonic | 80% | 15% | 28 sec. | 305 |
| 40% Benzene sulfonic | 75% | 15% | 31 sec. | 235 |
| 65% Phosphoric | 85% | 15% | 28 sec. | 35 |
| 8% Methane sulfonic | 100% | 15% | 55 sec. | 95 |

*Percent based on binder content.

As can be observed from Table 3, the aromatic sulfonic acids are preferable for use in conjunction with the accelerator salts of the present invention. However, other acid catalysts can be suitably employed.

A further advantage of the use of the accelerators disclosed herein is that the amount of sulfonic acid catalysts required for curing can be reduced. This is significant for several reasons, both from environmental and quality standpoints. Reducing the amount of sulfonic acid results in reducing the amount of sulfur dioxide formed and exhausted to the atmosphere in a foundry. Also, high sulfur content in foundry cores or molds sometimes leads to defects in casting certain metals and the reduction of sulfur content is of advantage.

The following table illustrates the effectiveness of zinc chloride in reducing the amount of sulfonic acid catalyst without sacrificing cure speed or tensile strength.

TABLE 4

| 1% Binder | (1) TSA-65 | (2) $ZnCl_2$ | Strip Time | Tensile Strength Overnight-Ambient | Tensile Strength Overnight Hot |
|---|---|---|---|---|---|
| FAR | 25% | — | 28 min. | 440 | 280 |
| FAR | 15% | 5% | 31 min. | 400 | 295 |
| FAR | 25% | — | 34 min. | 430 | 315 |
| FAR | 15% | 5% | 35 min. | 370 | 290 |
| FAR | 10% | 12% | 35 min. | 295 | 155 |
| ChemSet ® 505 | 45% | — | 19 min. | 400 | 260 |
| " | 20% | 15% | 19 min. | 415 | 325 |
| " | 35% | — | 33 min. | 440 | 310 |
| " | 15% | 15% | 38 min. | 400 | 290 |
| ChemSet ® 415 | 40% | — | 41 min. | 208 | — |
| " | 25% | 10% | 44 min. | 200 | — |
| ChemSet ® 415 | 50% | — | 25 min. | 238 | — |
| " | 30% | 10% | 26 min. | 253 | — |
| " | 25% | 15% | 25 min. | 128 | — |

(1) 65% toluene sulfonic acid (aqueous)
(2) 70% zinc chloride (aqueous)
Wedron 525 sand
Reference: FX 122/p.178-182
FX 128/p.1-14, 196-200, 206-208
ChemSet ® 505 1.75% $H_2O$, 1.75% N Furan Binder
ChemSet ® 415 10% $H_2O$, 4% N Furan Binder
(Both from Thiem Corp.)

Those modifications and equivalents which fall within the spirit of the invention are to be considered a part thereof.

What is claimed is:

1. A foundry composition for forming sand cores or sand molds which at ambient temperature can be stripped from a mold cavity within a period of not more than about 40 seconds after placing the composition in said mold cavity which comprises sand, a sulfonic acid catalyst, a furan-based binder and an accelerator selected from the group of zinc chloride and copper chloride.

2. A composition in accordance with claim 1 wherein the accelerator is zinc chloride.

3. A composition in accordance with claim 1 wherein the catalyst is an aromatic sulfonic acid.

4. A composition in accordance with claim 1 wherein the aromatic sulfonic acid catalyst is benzene sulfonic acid.

5. A foundry composition for forming sand cores or sand molds which at ambient temperature can be stripped from a mold cavity in less than about 40 seconds which comprises:
    (a) a first admixture of sand and a sulfonic acid catalyst; and
    (b) a second admixture of sand, a furan-based binder and an accelerator selected from zinc chloride and copper chloride.

6. A composition in accordance with claim 5 wherein the accelerator is zinc chloride.

7. A composition in accordance with claim 5 wherein the catalyst is an aromatic sulfonic acid.

8. A composition in accordance with claim 5 wherein the aromatic sulfonic acid catalyst is benzene sulfonic acid.

9. A process for forming a foundry sand core or sand mold which comprises:
    (a) preparing a first mixture of sand and a sulfonic acid catalyst;
    (b) preparing a second mixture of sand, a furan-based binder and an accelerator selected from zinc chloride and copper chloride;

(c) mixing together said first and second sand mixtures and rapidly introducing at ambient temperature the resulting admixture into a mold; and (d) removing at ambient temperature a shaped sand mass from the mold within a period of not more than about 40 seconds from the time the admixture was introduced into said mold.

10. A process in accordance with claim 9 wherein the accelerator is zinc chloride.

11. A process in accordance with claim 9 wherein the catalyst is an aromatic sulfonic acid.

12. A process in accordance with claim 9 wherein the aromatic sulfonic acid catalyst is benzene sulfonic acid.

13. A process in accordance with claim 9 wherein in step (b) the furan-based binder is first mixed with the sand.

* * * * *